United States Patent [19]

Tsutsumi et al.

[11] Patent Number: 5,170,762
[45] Date of Patent: Dec. 15, 1992

[54] IGNITION TIMING CONTROL SYSTEM FOR INTERNAL COMBUSTION ENGINES

[75] Inventors: Kojiro Tsutsumi; Masaki Kanehiro; Kyozo Futa; Sachito Fujimoto, all of Wako, Japan

[73] Assignee: Honda Giken Kogyo Kabushiki Kaisha, Tokyo, Japan

[21] Appl. No.: 811,332

[22] Filed: Dec. 20, 1991

[30] Foreign Application Priority Data

Dec. 27, 1990 [JP] Japan .................. 2-414933

[51] Int. Cl.$^5$ .............................................. F02P 5/15
[52] U.S. Cl. .................................................. 123/425
[58] Field of Search ........................................ 123/425

[56] References Cited

U.S. PATENT DOCUMENTS

| | | | |
|---|---|---|---|
| 4,612,901 | 9/1986 | Iwata et al. | 123/425 |
| 4,898,139 | 2/1990 | Kitayama et al. | 123/425 |
| 4,934,327 | 6/1990 | Hidaka | 123/425 |
| 5,012,782 | 5/1991 | Tokuda | 123/425 |

Primary Examiner—Andrew M. Dolinar
Attorney, Agent, or Firm—Armstrong & Kubovcik

[57] ABSTRACT

An ignition timing control system for an internal combustion engine is operable to detect knocking occurring in the engine, determine basic ignition timing based upon operating conditions of the engine, correct the basic ignition timing by a correction value which is determined in response to an output from a knocking sensor, and inhibit correction of the correction value toward an advanced side with respect to at least one predetermined value in a timing retarding direction which is determined based upon operating conditions of the engine, when the correction value is greater than the at least one predetermined value. The correction value is initialized to a value based upon the difference between the correction value and the at least one predetermined value when the correction value exceeds the at least one predetermine value.

7 Claims, 12 Drawing Sheets

FIG.5

HIGHER LOAD →

| NE \ PBA | < PBKN0 ≤ | PBKN1 ≤ | |
|---|---|---|---|
| ∧ NACT0 | DADV 00 | 01 | 02 |
| ∧ ‖ NACT1 | 10 | 11 | 12 |
| ∧ ‖ NACT2 | 20 | 21 | 22 |
| ∧ ‖ NACT3 | 30 | 31 | 32 |
| ∧ ‖ | 40 | 41 | 42 |

HIGHER SPEED ↓

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines, and more particularly to improvements in or to an ignition timing control system, which are intended to prevent knocking irrespective of the octane value of fuel used in the engine.

2. Prior Art

Generally, if a fuel having a low octane value is used in an internal combustion engine which is designed to operate on a fuel having a high octane value, knocking can occur. To overcome this problem, an ignition timing control system for an internal combustion engine has been proposed by the assignee of the present application by Japanese Provisional Patent Publication (Kokai) No. 2-213190), which comprises operating condition detecting means for detecting operating conditions of the engine, knocking detecting means for detecting knocking occurring in the engine, basic ignition timing determining means for determining basic ignition timing based upon operating conditions of the engine, ignition timing correcting means for correcting the basic ignition timing by a correction value which is determined in response to an output from the knocking detecting means, and advancing correction inhibiting means for inhibiting correction of the correction value toward an advanced side with respect to a predetermined value in a timing retarding direction which is determined based upon operating conditions of the engine, when the correction value is greater than the predetermined value.

According to this proposed system, when knocking is detected, the ignition timing is corrected in the retarding direction. When the correction value in the retarding direction exceeds the predetermined value, it is decided that a fuel having a low octane value is used in the engine, and then correction of the correction value toward an advanced side with respect to the predetermined value is inhibited.

However, in the case where there occurs a change in the engine load, the proposed system has the following disadvantage:

FIG. 13(A) shows the relationship between engine load and ignition timing (timing advance) $\theta$ig. In the figure, symbol $\theta$MAP represents basic ignition timing which contains no retarding correction, and the difference ($\theta$MAP−$\theta$LMT) corresponds to the above-mentioned predetermined value. The region below the line $\theta$LMT corresponds to ignition timing applied when a low octane fuel is used. Let it be assumed that a retarding correction amount $\theta$KNOCK is applied as $\theta$KNOCK1 when the engine load assumes a value L1 (point P1). The correct amount $\theta$KNOCK1 is greater than the predetermined value ($\theta$MAP−$\theta$LMT), and therefore it is decided that a low octane fuel is used. If the engine load then abruptly increases up to L2, the retarding correction amount $\theta$KNOCK still remains $\theta$KNOCK1 (point P2) immediately after the abrupt increase, resulting in occurrence of knocking. Accordingly, the retarding correction amount $\theta$KNOCK is gradually corrected toward an increased amount $\theta$KNOCK2 at which no knocking can occur (P3), by repeatedly adding a retard unit amount DKNOCK to the amount $\theta$KNOCK. Then, if the engine load suddenly decreases from L2 to L1, the correction amount $\theta$KNOCK2 is still applied immediately after the sudden decrease (P4), which results in overcorrection and hence an excessive drop in the engine output. If the engine load thereafter remains at L1, the retarding correction amount $\theta$KNOCK is gradually corrected to $\theta$KNOCK1 by being decremented by an advance unit amount DADV.

As mentioned above, the proposed system has the disadvantage of re-occurrence of knocking or excessive drop in the engine output immediately after an abrupt change in the engine load.

SUMMARY OF THE INVENTION

It is the object of the invention to provide an ignition timing control system for internal combustion engines, which is capable of properly setting the retarding correction amount even at a sudden change in the engine load to thereby prevent re-occurrence of knocking and an excessive drop in the engine output.

To attain the above object, the present invention provides an ignition timing control system for an internal combustion engine, including operating condition detecting means for detecting operating conditions of the engine, knocking detecting means for detecting knocking occurring in the engine, basic ignition timing determining means for determining basic ignition timing based upon operating conditions of the engine, ignition timing correcting means for correcting the basic ignition timing by a correction value which is determined in response to an output from the knocking detecting means, and advancing correction inhibiting means for inhibiting correction of the correction value toward an advanced side with respect to at least one predetermined value in a timing retarding direction which is determined based upon operating conditions of the engine, when the correction value is greater than the at least one predetermined value.

The ignition timing control system according to the invention is characterized by an improvement comprising:

determining means for determining whether or not the correction value exceeds the at least one predetermined value; and initializing means responsive to an output from the determining means for initializing the correction value to a value based upon a difference between the correction value and the at least one predetermined value when the correction value exceeds the at least one predetermine value.

Preferably, the correction value is initialized to the difference or the sum of the difference and the at least one predetermined value, depending upon zones each having an ignition timing control characteristic corresponding to an octane value of a fuel used in the engine.

Preferably, the at least one predetermined value is set by a parameter indicative of load on the engine.

Also preferably, the difference between the correction value and the at least one predetermined value is corrected in a direction of advancing or retarding ignition timing of the engine in response to frequency of occurrence of knocking in the engine, the initialization of the correction value comprising initializing the difference.

The above and other objects, features, and advantages, of the invention will be more apparent from the ensuing detailed description taken in conjunction with the accompanying drawings.

BRIEF DESCRIPTION OF THE DRAWINGS

FIG. 5 shows a map for calculating an advance unit amount DADV;

FIG. 13 (B) is a similar view to FIG. 13 (B) useful in explaining results of the present invention.

DETAILED DESCRIPTION

The invention will now be described in detail with reference to the drawings showing an embodiment thereof.

Figure 1:
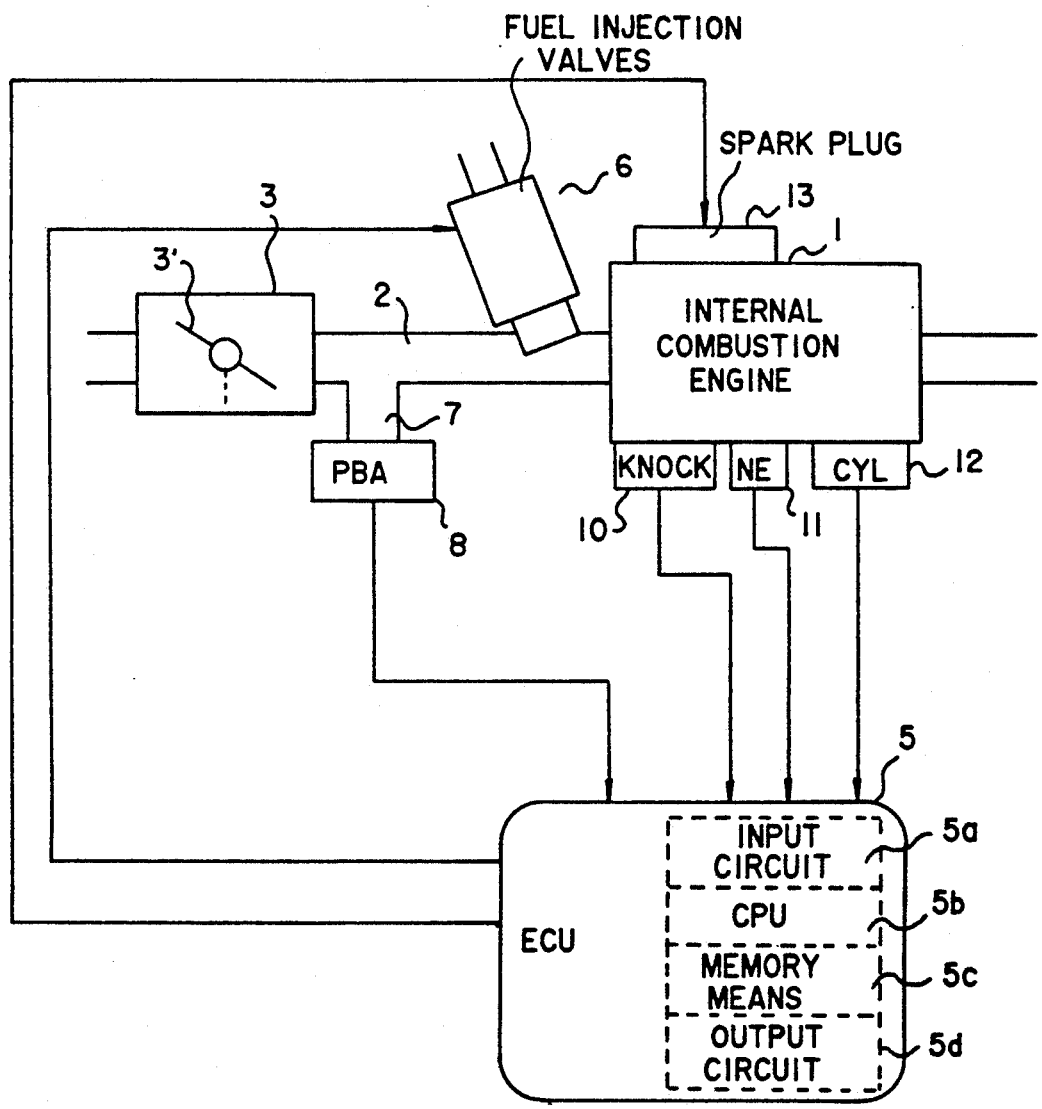
FIG. 1 is a block diagram showing the whole arrangement of an ignition timing control system according to an embodiment of the invention.

Referring first to FIG. 1, there is shown the whole arrangement of an ignition timing control system according to an embodiment of the invention. In an intake pipe 2 of an engine 1, there is arranged a throttle body 3 accommodating a throttle valve 3' therein.

An intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure to an electronic control unit (hereinafter referred to as "the ECU") 5.

A knocking sensor 10 is inserted into the cylinder block of the engine 1 for detecting vibrations or knocking, for supplying an electric signal indicative of the detected vibrations to the ECU 5.

An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A spark plug 13 of each cylinder of the engine 1 is electrically connected to the ECU 5 to have its ignition timing $\theta$ig controlled by a signal therefrom.

Fuel injection valves 6 are each provided for each cylinder and arranged in the intake pipe between the engine 1 and the throttle valve 3', and at a location slightly upstream of an intake valve, not shown. The fuel injection valves 6 are connected to a fuel pump, not shown, and electrically connected to the ECU 5 to have their valve opening periods controlled by signals therefrom.

The ECU 5 comprises an input circuit 5a having the functions of shaping the waveform of input signals from various sensors including the above-mentioned ones and other sensors, not shown, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5b which outputs driving signals to the spark plugs 13 and the fuel injection valves 6.

The CPU 5b calculates the ignition timing $\theta$ig based upon basic ignition timing $\theta$MAP set in accordance with the engine rotational speed NE and the intake pipe absolute pressure PBA, and calculates the valve opening period or fuel injection period $T_{OUT}$ over which the fuel injection valves 6 are to be opened, in response to operating conditions of the engine 1.

The CPU 5 supplies driving signals corresponding to the ignition timing $\theta$ig and the fuel injection period $T_{OUT}$ determined as above to the spark plugs 13 and the fuel injection valves 6 through the output circuit 5d.

In the present embodiment, the ECU 5 forms basic ignition timing determining means, ignition timing correcting means, advancing correction inhibiting means, and correction value initializing means.

Figure 2:
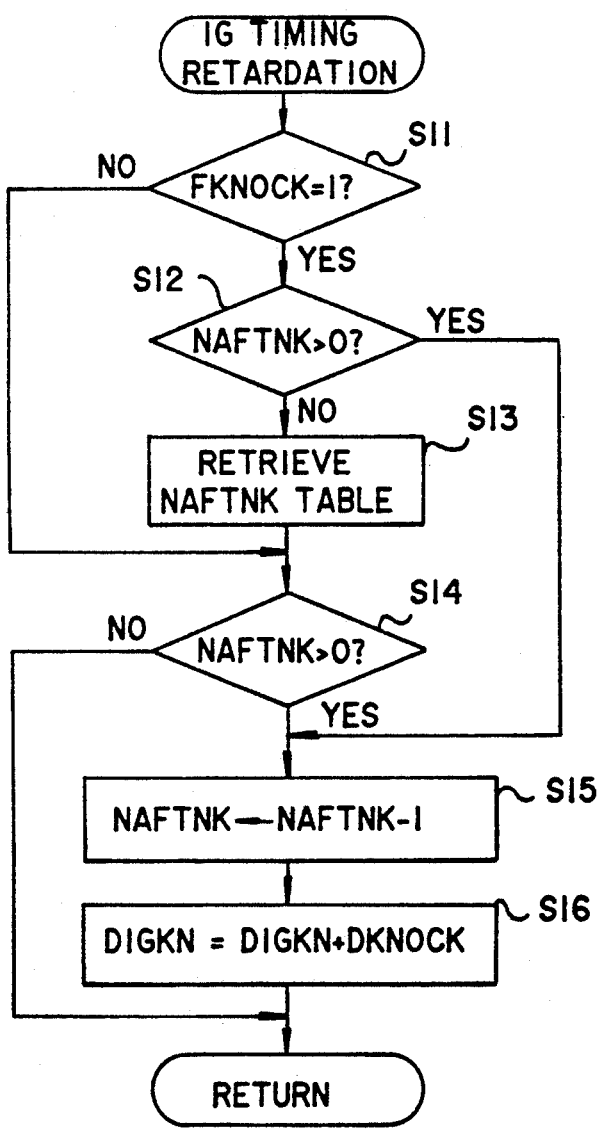
FIG. 2 is a flowchart showing a program for correcting a retarding amount-calculating variable DIGKN in a retarding direction.

FIG. 2 shows a program for carrying a processing of changing in a timing retarding direction a retarding amount-calculating variable DIGKN which is used to calculate a correction value IGKNOCK for the ignition timing $\theta$ig. The variable DIGKN is calculated in dependence on occurrence of knocking. The correction value IGKNOCK corrects the basic ignition timing $\theta$MAP in the retarding (decreasing) direction, and is set equal to the variable DIGKN when the octane value of fuel used in the engine is a proper value (high octane value) (ZONE=0), as hereinafter described. The present program is executed whenever each TDC signal pulse is generated and in synchronism therewith.

Figure 3:
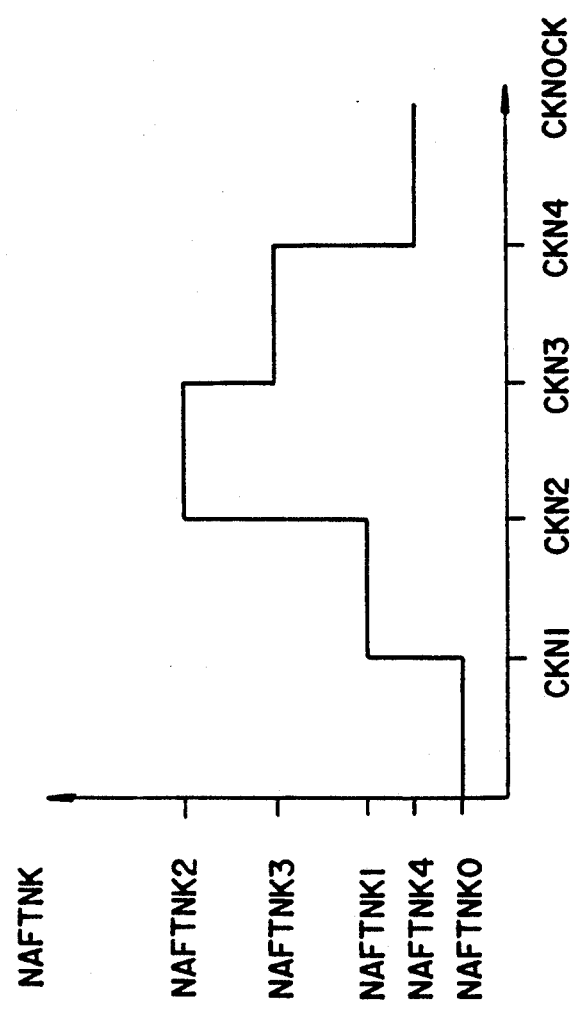
FIG. 3 shows a table for calculating a number of times of ignitions NAFTNK for continuous retarded ignitions.

At a step 11 in FIG. 2, it is determined whether or not a flag FKNOCK, which is set to a value of 1 upon occurrence of knocking, assumes the value of 1. If the answer is negative (NO), i.e. if knocking has not occurred, the program jumps to a step S14. If the answer is affirmative (YES), i.e. if knocking has occurred, it is determined at a step S12 whether or not an ignition time number (retarded ignition time number) NAFTNK for continuous retarded ignitions, which is indicative of the number of times of ignitions at retarded timing which are to be continuously effected is greater than 0. If the answer is affirmative (YES), i.e. if NAFTNK>0, the program jumps to a step S15, whereas if the answer is negative (NO), i.e. if NAFTNK≦0, a value of the retarded ignition time number NAFTNK is read from an NAFTNK table in FIG. 3, which corresponds to a count CKNOCK of a knocking frequency counter, at a step S13. The knocking frequency counter counts a number of times of occurrence of knocking within a time period corresponding to a predetermined number of times of ignitions effected (e.g. 120).

Then, it is determined at a step S14 whether or not the time number NAFTNK is greater than 0. If the answer is negative (NO), i.e. if NAFTNK≦0, the program is immediately terminated without effecting retardation of ignition timing. If the answer is affirmative (YES), i.e. if NAFTNK>0, the value NAFTNK is decremented by 1 at the step S15, and then a retard unit amount DKNOCK (e.g. 0.234°) is added to the variable DIGKN to thereby change the retarding correction amount in the increasing direction at a step S16, followed by terminating the program.

According to the program of FIG. 2 described above, the value DIGKN is continuously corrected in the increasing (retarding) direction by the ignition time number NAFTN corresponding to the frequency of occurrence of knocking.

Figure 4:
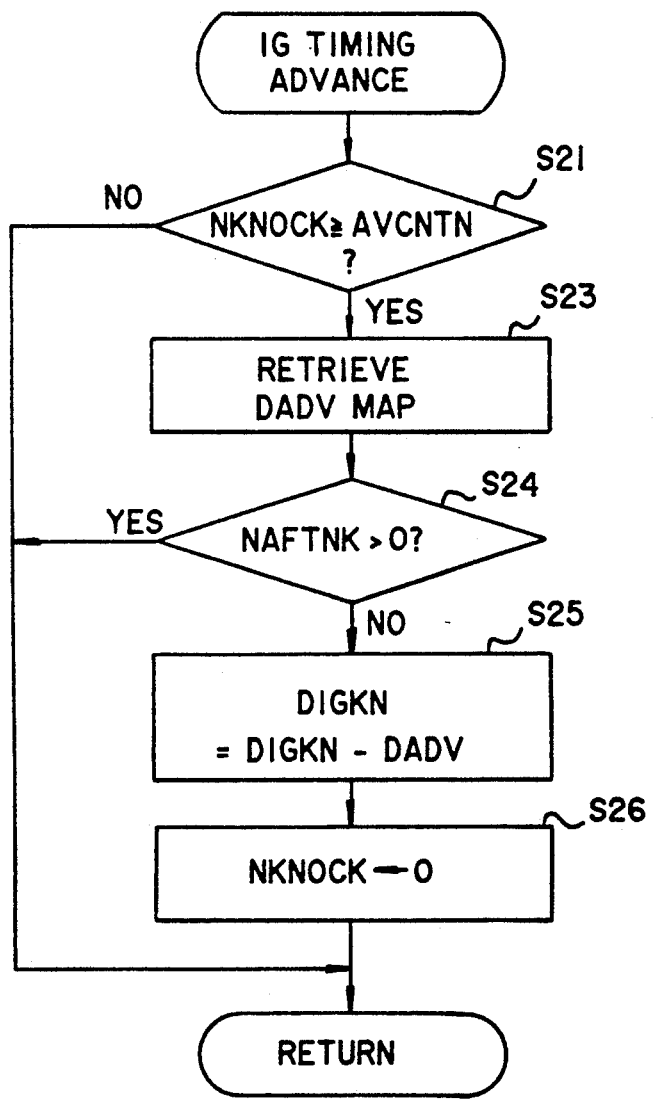
FIG. 4 is a flowchart of a program for correcting the retarding amount-calculating variable DIGKN in an advancing direction.

FIG. 4 shows a program for correcting the retarding amount-calculating variable DIGKN in the advancing (decreasing) direction when a number of times of ignitions (continuous knockingless time number) NKNOCK at which knocking does not occur continuously is greater than a predetermined value AVCNTN. This program is also executed whenever each TDC signal pulse is generated and in synchronism herewith.

At a step S21 in FIG. 4, it is determined whether or not the continuous knockingless time number NKNOCK exceeds the predetermined value AVCNTN. If the answer is negative (NO), i.e. if NKNOCK<AVCNTN, the program is immediately terminated. If the answer is affirmative (YES), i.e. if NKNOCK≧AVCNTN, an advance unit amount DADV is read from a DADV map set in accordance with engine rotational speed NE and intake pipe absolute pressure PBA as shown in FIG. 5, at a step S23. For example, when NACT1≦NE≦NACT2 and PBKN0≦PAB<PBKN1, a value DADV11 is read from the DADV map. At the next step S24, it is determined whether or not the continuous retarded ignition time number NAFTNK is greater than 0. If the answer is affirmative (YES), it means that the ignition timing retardation is being carried out by the FIG. 2 program. Accordingly, the program is immediately terminated.

If the answer to the question of the step S24 is negative (NO), i.e. if NAFTNK≦0, the advance unit amount DADV is decreased from the variable DIGKN at a step S25, and the continuous knockingless ignition time number is reset to 0 at a step S26, followed by terminating the program.

According to the FIG. 4 program described above, whenever the continuous knockingless ignition number NKNOCK reaches the predetermined number AVCNTN, the DIGKN value is corrected in the advancing direction by the advance unit amount DADV. But, this correction is inhibited during the ignition timing retardation (NAFTNK>0).

Figure 6:
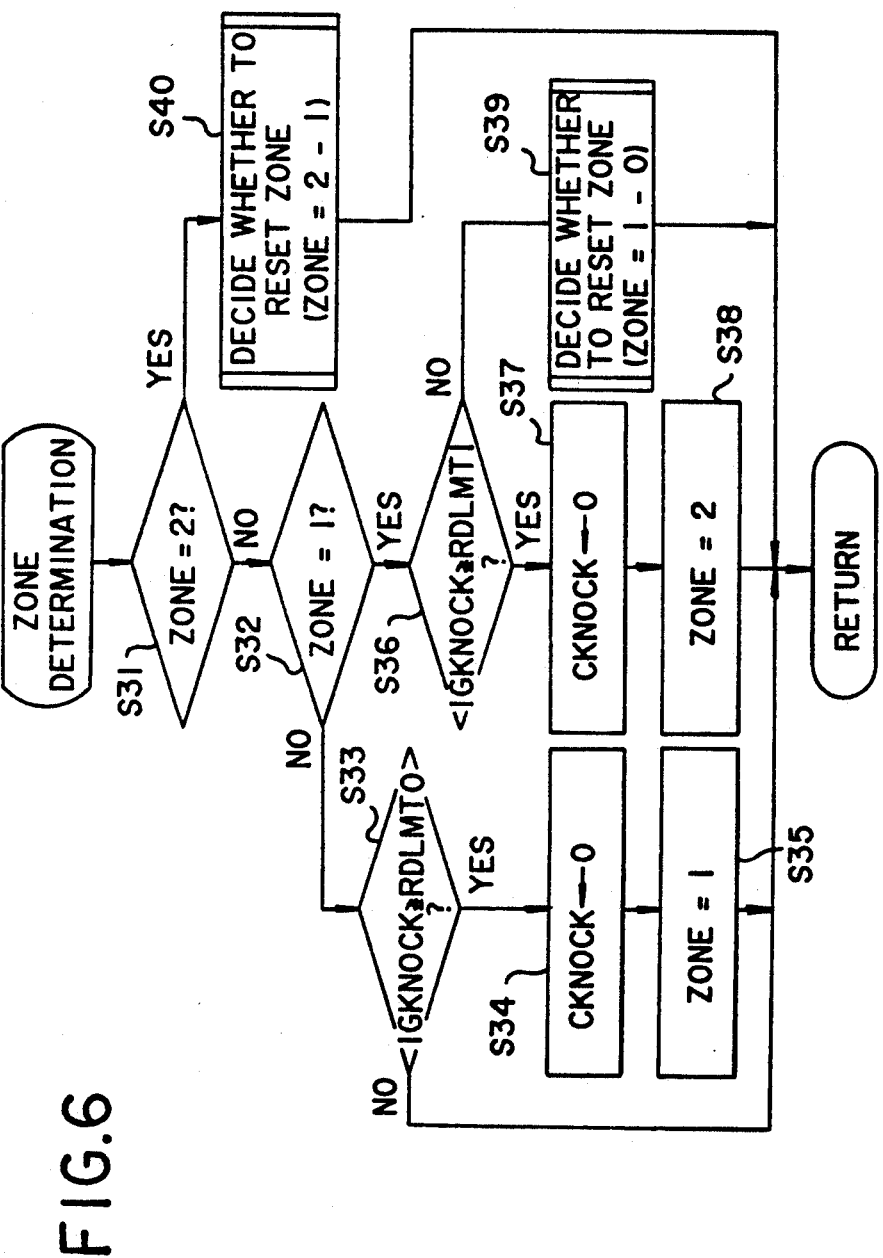
FIG. 6 is a flowchart for determining zones in which different ignition timing characteristics are to be applied.

FIG. 6 shows a program for determining zones (ZONE) based upon a correction value IGKNOCK for correcting the ignition timing.

Figure 7:
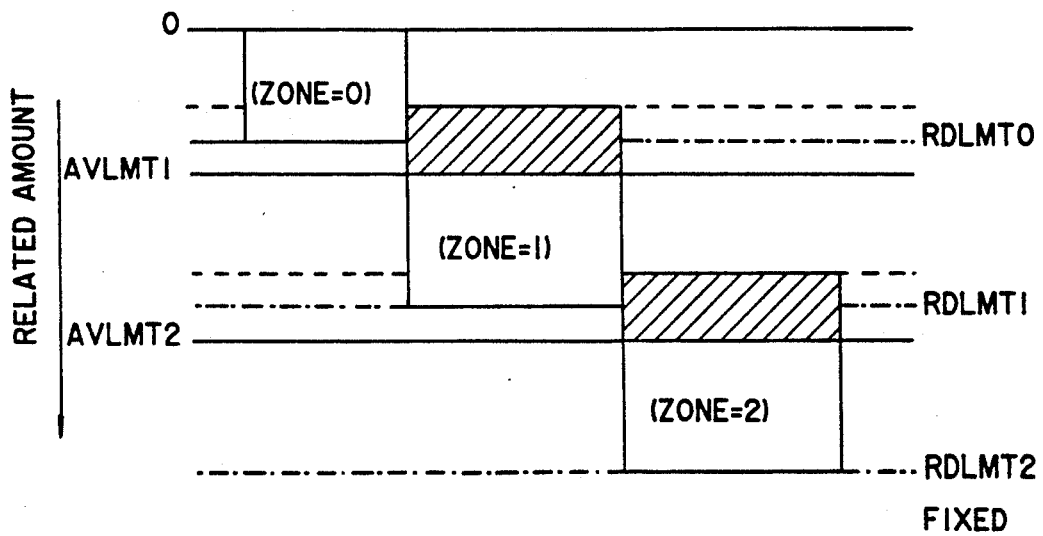
FIG. 7 is a view useful in explaining the zones.

Before explaining the present program, reference is made to FIG. 7 showing the zones.

Figure 8:
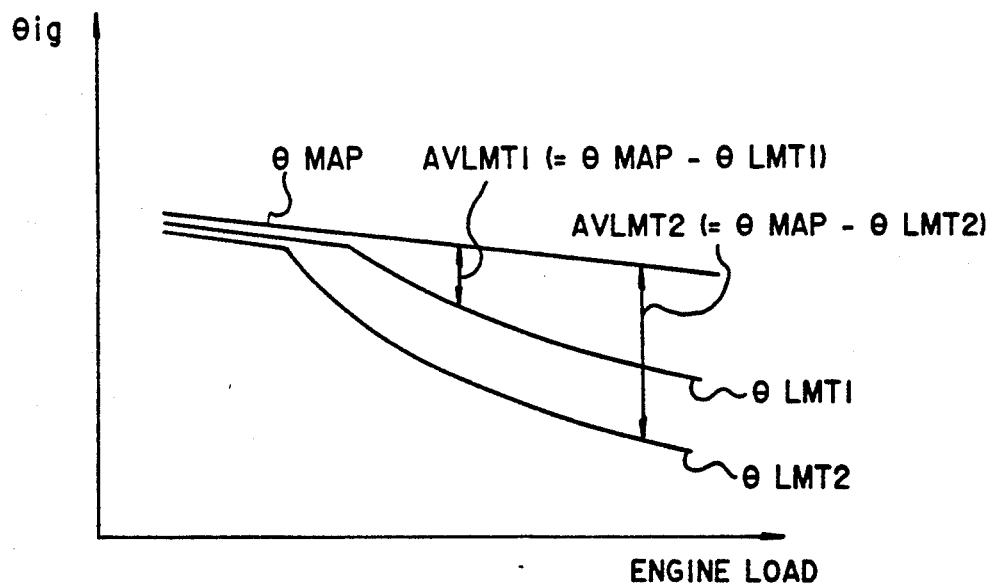
FIG. 8 shows, by way of example, changes in advance limit values AVLMT1, AVLMT2 relative to engine load.

In the present embodiment, as shown in FIG. 7, three zones 0, 1 and 3 are provided, which correspond respectively to different octane values of fuel used in the engine. More specifically, the zone 0 has an ignition timing control characteristic suitable for the use of fuel having an octane value of approximately 100, the zone 1 approximately 95, and the zone 2 approximately 92. The greater the zone number, the later the ignition timing, as shown in FIG. 7. In FIG. 7, symbols AVLMT1, and AVLMT2 represent respective advance limits of the zones 1, 2. For example, basically, if the zone 2 holds, the ignition timing cannot be set to an earlier timing than the advance limit AVLMT2. The advance limits AVLMT1, AVLMT2 are set in accordance with engine rotational speed and engine load, and set with respect to engine load as shown in FIG. 8. In FIG. 7, the retarding amount of 0 corresponds to the basic ignition timing θMAP. Further, the zones 0-2 are provided with retard-side discriminating values RDLMT0, RDLMT1, and RDLMT2, respectively, which are used to discriminate zones based upon the correction value IGKNOCK by the program of FIG. 6. The retard-side discriminating values RDLMT0, RDLMT1 are variable and set by adding an addend, which is set in accordance with the engine rotational speed, to the advance limit AVLMT0 or AVLMT1, while the discriminating value RDLMT2 on the most retarded side is a fixed value. The correction value IGKNOCK for correcting the ignition timing is controlled between the advance limit AVLMTn and the retard-side discriminating value RDLMTn. In FIG. 7, the hatched areas are regions in which a determination as to whether the zone is to be changed from 2 to 1 or from 1 to 2 (hereinafter called "zone resetting") is made. The zone resetting is carried out by a subroutine, not shown, in such a manner as to avoid hunting, e.g. between zone 1 and zone 0.

The program of FIG. 6 will be now explained on the assumption that the zone is initialized to zone 0 when the ignition switch of the engine is turned on. At a step S31, it is determined whether or not a variable ZONE indicative of the present zone has a value of 2. If the answer is negative (NO), i.e. if zone 2 does not hold, it is determined at a step S32 whether or not the variable ZONE has a value of 1. If the answer is negative (NO), too, i.e. if ZONE=0, it is determined at a step S33 whether or not the correction value IGKNOCK is equal to or greater than the first discriminating value RDLMT0. If the answer to the step S33 is negative (NO), i.e. if IGKNOCK<RDLMT0, it is judged that the zone 0 still continues, and then the program is immediately terminated. If the answer to the step S33 is affirmative (YES), i.e. if IGKNOCK≧RDLMT0, it is judged that the zone should be changed to 1, and then the knocking frequency counter CKNOCK is reset to 0 at a step S34, and the variable ZONE is set to 1 at a step S35, followed by terminating the program.

If the answer to the step S32 is affirmative (YES), i.e. if ZONE=1, it is determined at a step S36 whether or not the correction value IGKNOCK is equal to or greater than the second discriminating value RDLMT1. If the answer is affirmative (YES), i.e. if IGKNOCK≧RDLMT1, it is judged that the zone should be changed to 2, and then the knocking frequency counter CKNOCK is reset to 0 at a step S37, and the variable ZONE is set to 2 at a step S38, followed by terminating the program.

If the answer to the step S36 is negative (NO), i.e. if IGKNOCK<RDLMT1, it is determined whether or not zone resetting can be effected, and only when zone resetting can be effected, the variable ZONE is reset to 0, while when zone resetting cannot be effected, the state of ZONE=1 is continued (step S39). If the answer to the step S31 is affirmative (YES), i.e. if ZONE=2, a similar determination to the step S39 is made, and only when zone resetting is possible, the variable ZONE is set to 1, and otherwise the state of ZONE=2 is maintained (step S40).

Figure 9:
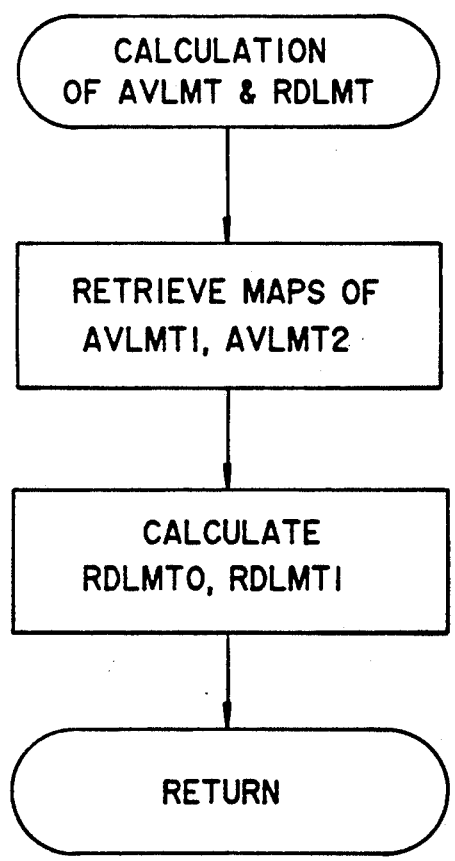
FIG. 9 is a flowchart showing a program for calculating advance limit values AVLMT1, AVLMT2 and discriminating reference values RFLMT0, RFLMT1.

FIG. 9 shows a program for calculating the advance limits AVLMT1, AVLMT2, and the discriminating values RDLMT0, RDLMT1. The advance limits AVLMT1, AVLMT2 are read from a map set in accordance with engine rotational speed NE and intake pipe absolute pressure PBA. The discriminating values RDLMT0, RDLMT1 are calculated by reading an addend from a map set in accordance with engine rotational speed NE and adding the read addend to the advance limit AVLMT1 or AVLMT2.

Figure 10:
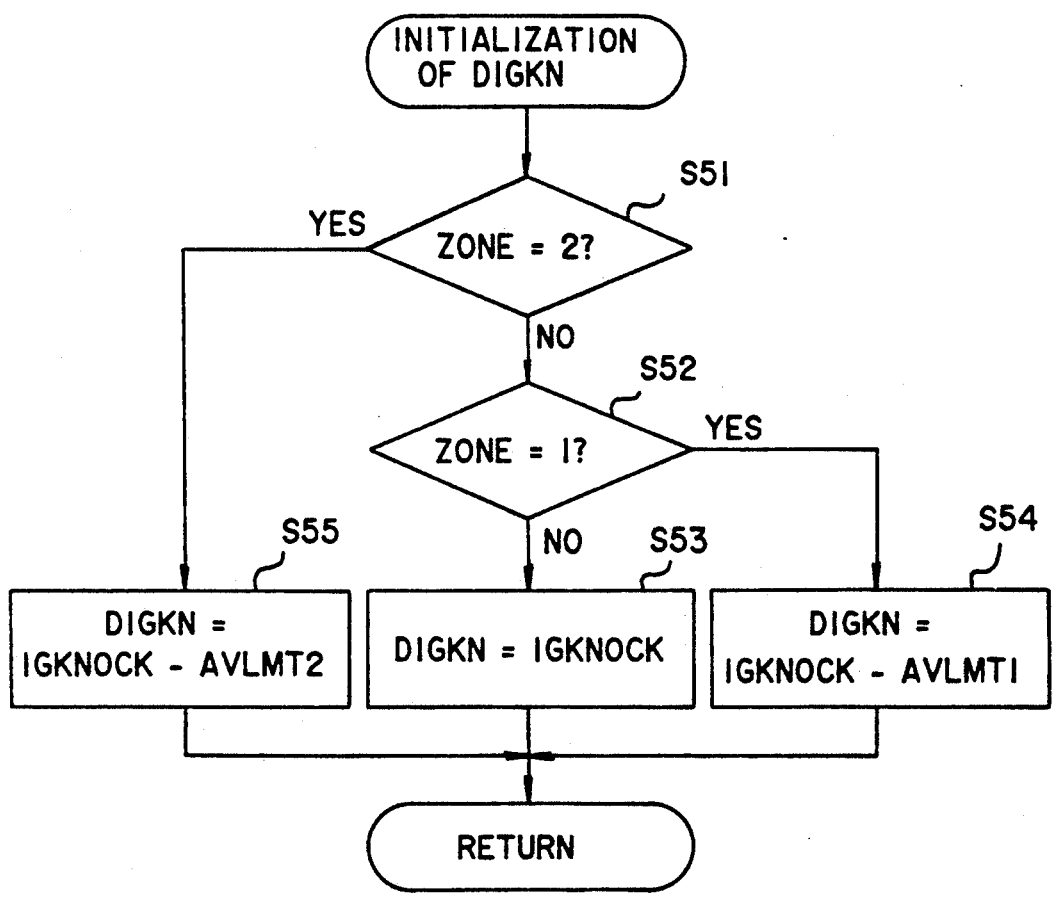
FIG. 10 is a flowchart showing a program for initializing the retarding amount-calculating variable DIGKN.

FIG. 10 shows a program for initializing the retarding amount calculating variable DIGKN in each zone.

At steps S51 and S52 in FIG. 10, zone determinations are made. If ZONE=0 (the answers to the steps S51, S52 are both negative (NO)), the variable DIGKN is set equal to IGKNOCK. If ZONE=1 (the answer to the step S52 is affirmative (YES)), the variable DIGKN is set to the difference between IGKNOCK and AVLMT1 at a step S54. If ZONE=2 (the answer to the step S51 is affirmative (YES), DIGKN is set to the difference between IGKNOCK and AVLMT2 at a step S55.

Figure 12:
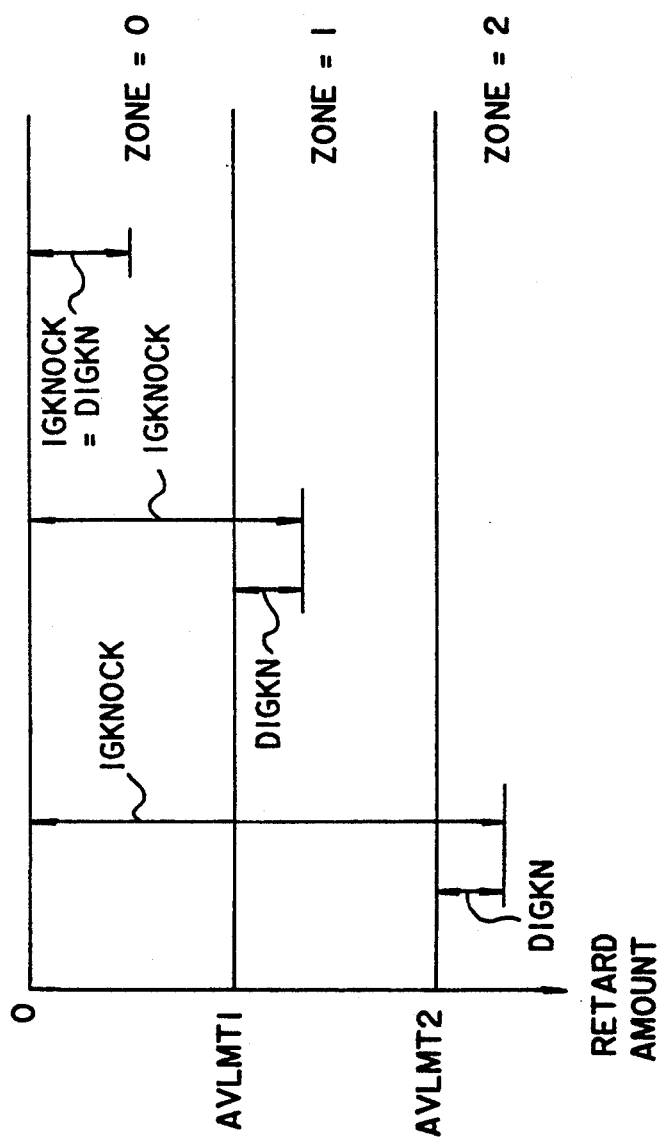
FIG. 12 is a view useful in explaining the manner of calculating the correction value IGKNOCK.

The variable DIGKN thus set by the program of FIG. 10 is in the relationship with the correction value IGKNOCK in the zones 0-2 as shown in FIG. 12.

Figure 11:
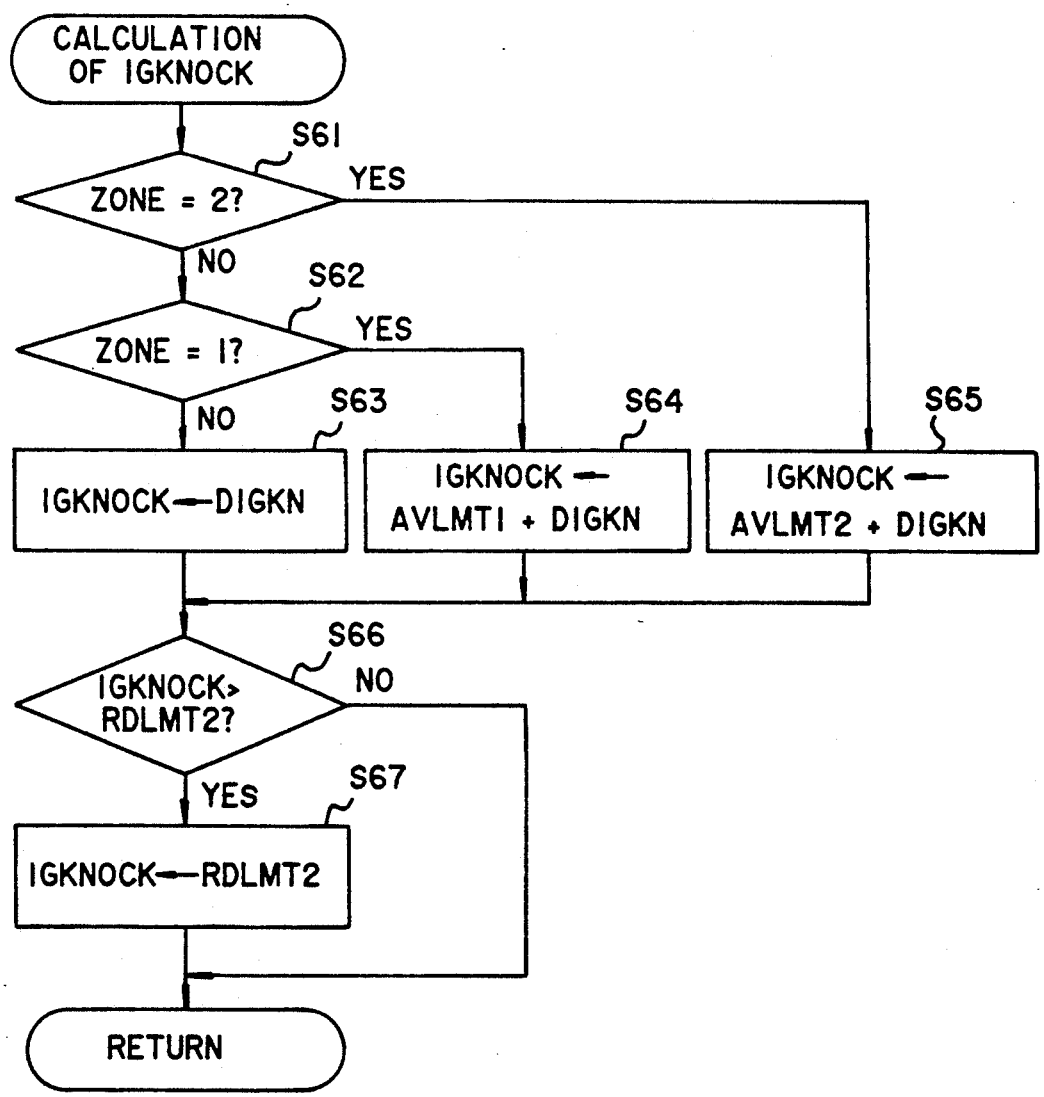
FIG. 11 is a flowchart showing a program for calculating a correction value IGKNOCK.

FIG. 11 shows a program for calculating the correction value IGKNOCK by the use of the variable DIGKN which has been initialized by the program of FIG. 10.

At steps S61, S62, zone determinations are made. If ZONE=0 (the answers to the steps S61, S62 are both negative (NO)), the correction value IGKNOCK is set equal to DIGKN at a step S63. If ZONE=1 (the answer to the step S62 is affirmative (YES)), IGKNOCK is set to the sum of AVLMT1 and DIGKN at a step S64. If ZONE=2 (the answer to the step S61 is affirmative (YES)), IGKNOCK is set to the sum of AVLMT2 and DIGKN at a step S65.

After execution of the steps S63-S65, it is determined at a step S66 whether or not the correction value IGKNOCK set as above is greater than the most retarded side discriminating value RDLMT2. If the answer is negative (NO), the program is immediately terminated, whereas if the answer is affirmative (YES), IGKNOCK is set equal to RDLMT2 at a step S67, followed by terminating the program.

The above described programs of FIG. 2, FIG. 4, FIG. 6, and FIGS. 9-11 are all executed whenever each TDC signal pulse is generated and in synchronism therewith. These programs are executed in the following order: First, the program of FIG. 10 is executed to initialize the retarding amount-calculating variable DIGKN. In initializing the variable DIGKN, as the values of the parameters ZONE, IGKNOCK, AVLMT1 and AVLMT2, values are used which have been obtained immediately before by respective calculation programs. Then, the programs of FIGS. 2 and 4 are executed to correct the retarding amount-calculating variable DIGKN. This is followed by execution of the program of FIG. 9 to calculate the advance limits AVLMT1, AVLMT2 and the discriminating values RDLMT0, RDLMT2. Then, the program of FIG. 11 is executed to calculate the correction value IGKNOCK. Finally, the zone determination is carried out by the program of FIG. 6.

Figure 13A:
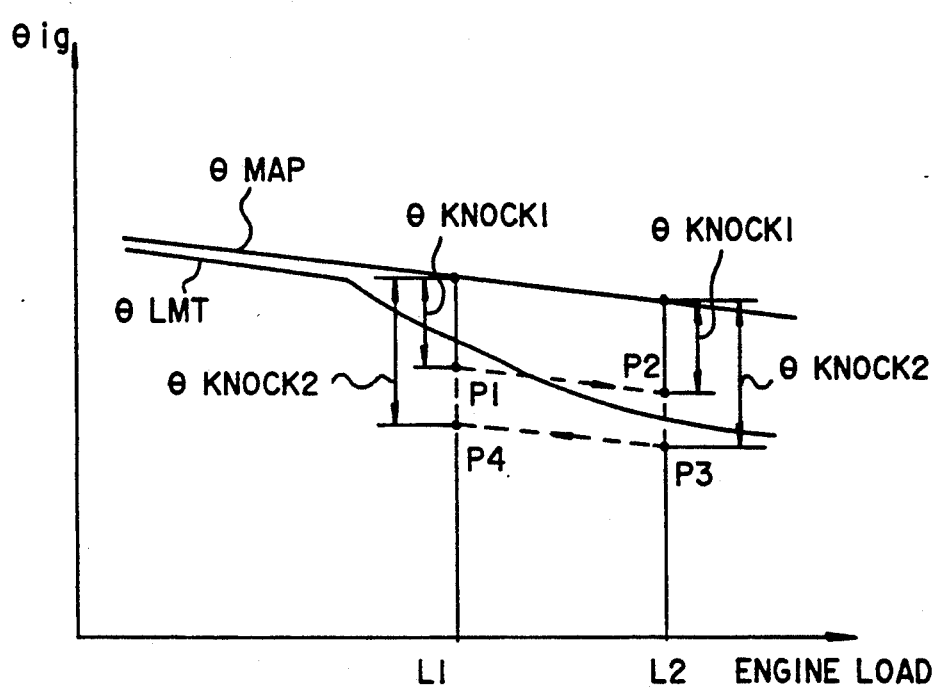
FIG. 13 (A) is a view useful in explaining results of prior art.
Figure 13B:
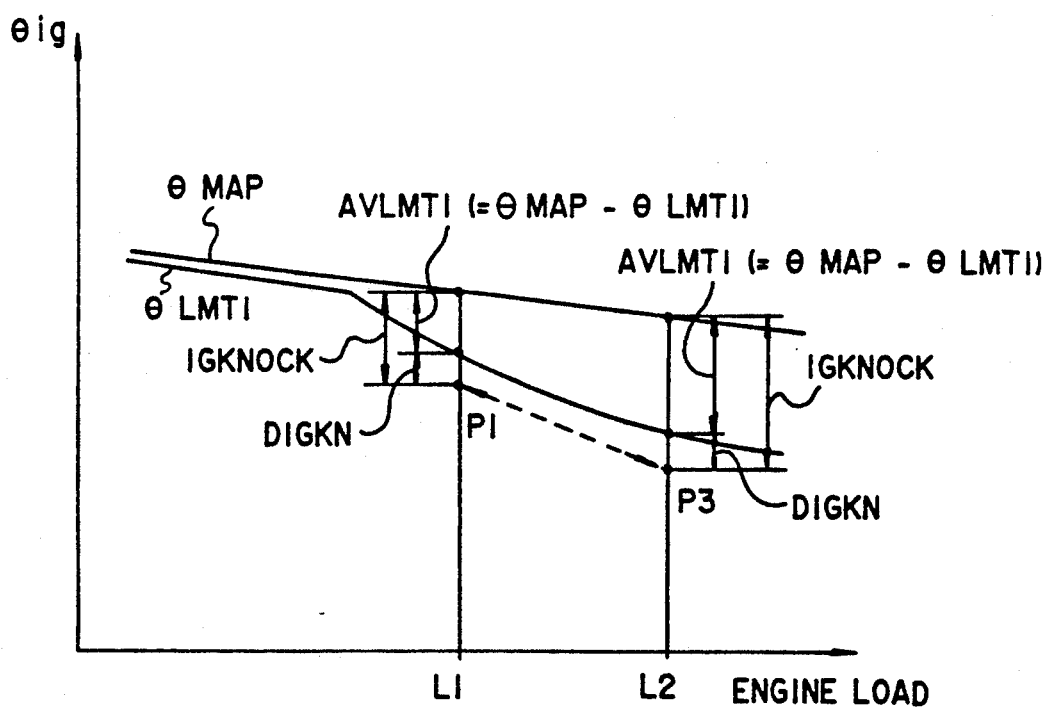

By executing the programs in the above-mentioned order, as shown in FIG. 13 (B) for example, in the case that the engine load has changed from L1 to L2, the correction value IGKNOCK to be applied at load L2 is calculated as the sum of values DIGKN and AVLMT1 calculated at load L2. The DIGKN value initialized at load L1 is added, at load L2, to the AVLMT1 value calculated at load L2, without being substantially corrected (even if corrected, the correction amount is very small, which corresponds to the retard unit amount DKNOCK or the advance unit amount DADV), whereas the AVLMT1 value is calculated as a function of engine rotational speed NE and intake pipe absolute pressure PBA as mentioned before, and therefore assumes a much greater value at load L2 as compared with the AVLMT1 value obtained at load L1. As a result, the correction value IGKNOCK obtained at load L2 assumes a much greater value as compared with the IGKNOCK value obtained at load L1. Accordingly, the ignition timing is largely retarded from P1 to P3 as the engine load increases from L1 to L2. Similarly, in the case that the engine load changes from L2 to L1, the ignition timing is largely advanced from P3 to P1. Therefore, according to the invention, it is possible to prevent the disadvantages of re-occurrence of knocking due to an insufficient retarding amount (at point P2) and an excessive drop in the engine output due to overcorrection of the ignition timing (at point P4) as in the prior art shown in FIG. 13 (A).

Although in the above described embodiment the advance limits AVLMT1, AVLMT2 are set to different values from the discriminating values RDLMT0, RDLMT1, this is not limitative, but the former may be set equal to the latter such that AVLMT1=RDLMT0, and AVLMT2=RDLMT1. Further, in the zone determination of FIG. 6, RDLMT0, RDLMT1 at step S33, S36 may be replaced by AVLMT1, AVLMT2, respectively.

What is claimed is:

1. In an ignition timing control system for an internal combustion engine, including operating condition detecting means for detecting operating conditions of said engine, knocking detecting means for detecting knocking occurring in said engine, basic ignition timing determining means for determining basic ignition timing based upon operating conditions of said engine, ignition timing correcting means for correcting said basic ignition timing by a correction value which is determined in response to an output from said knocking detecting means, and advancing correction inhibiting means for inhibiting correction of said correction value toward an advanced side with respect to at least one predetermined value in a timing retarding direction which is determined based upon operating conditions of said engine, when said correction value is greater than said at least one predetermined value, the improvement comprising:

determining means for determining whether or not said correction value exceeds said at least one predetermined value; and initializing means responsive to an output from said determining means for initializing said correction value to a value based upon a difference between said correction value and said at least one predetermined value when said correction value exceeds said at least one predetermine value.

2. An ignition timing control system as claimed in claim 1, wherein said correction value is initialized to said difference or the sum of said difference and said at least one predetermined value, depending upon zones each having an ignition timing control characteristic corresponding to an octane value of a fuel used in said engine.

3. An ignition timing control system as claimed in claim 1 or 2, wherein said at least one predetermined value is set by a parameter indicative of load on said engine.

4. An ignition timing control system as claimed in claim 3, wherein said at least one predetermined value is set by rotational speed of said engine and intake pipe pressure of said engine.

5. An ignition timing control system as claimed in claim 1 or 2, wherein said difference between said correction value and said at least one predetermined value is corrected in a direction of advancing or retarding ignition timing of said engine in response to frequency of occurrence of knocking in said engine, said initialization of said correction value comprising initializing said difference.

6. An ignition timing control system as claimed in claim 2, wherein said zones are discriminated by determining whether or not said correction values exceeds respective second predetermined values.

7. An ignition timing control system as claimed in claim 6, wherein said first-mentioned at least one predetermined value comprises a plurality of predetermined values provided respectively for said zones, said second predetermined values each having a value retarding ignition timing of said engine by a larger amount than a corresponding one of said predetermined values of said at least one predetermined value.

* * * * *